United States Patent [19]

Miller et al.

[11] Patent Number: 5,365,383

[45] Date of Patent: * Nov. 15, 1994

[54] SYSETM FOR OPTICALLY SENSING THE PLACEMENT OF MAGNETIC TAPE CARTRIDGE MEDIA IN A COMPUTER MEMORY BACKUP DEVICE

[75] Inventors: Kevin L. Miller; Eric M. Krug, both of Loveland, Colo.; James A. Imthurn, Rathdrum, Id.

[73] Assignee: Hewlett-Packard Company, Palo Alto, Calif.

[ * ] Notice: The portion of the term of this patent subsequent to Jun. 22, 2010 has been disclaimed.

[21] Appl. No.: 612,835

[22] Filed: Nov. 13, 1990

[51] Int. Cl.$^5$ .................. G11B 15/18; G11B 15/008; G01N 21/86

[52] U.S. Cl. ..................... 360/69; 360/74.6; 360/93; 250/561

[58] Field of Search ............. 360/69, 71, 74.6, 96.5, 360/93, 85; 369/77.2; 250/561

[56] References Cited

U.S. PATENT DOCUMENTS

| | | | |
|---|---|---|---|
| 3,825,949 | 7/1974 | Pyles | 360/91 |
| 4,584,620 | 4/1986 | Döpp et al. | 360/128 |
| 4,607,303 | 8/1986 | Cybulski | 360/96.5 |
| 4,733,314 | 3/1988 | Ogawa et al. | 360/71 |
| 4,864,439 | 9/1989 | Duurland | 360/96.5 |
| 5,222,003 | 6/1993 | Miller et al. | 360/74.6 |

OTHER PUBLICATIONS

Author: ANX TC X3B5; Title: Unrecorded Magnetic Mini Tape Cartridge for Information Interchange; date unknown.

Primary Examiner—Aristotelis Psitos
Assistant Examiner—Varsha A. Kapadia

[57] ABSTRACT

A computer memory backup device which utilizes standardized computer tape cartridges is disclosed. The focus of the invention is upon the techniques for ascertaining the appropriate placement of such cartridges to allow operation of the computer memory backup device. The device being connected to a computer allows for the determination of a cartridge presence through the use of an optical sensor mechanism. The sensor mechanism includes a light emitting diode (l.e.d.), light pipe and phototransistor. During any time that the cartridge is not in the computer memory device or improperly or incompletely inserted the electromagnetic radiation emitted by the l.e.d. will be directed by the light pipe to the phototransistor. In this manner a negative determination is correctly made. When the cartridge is correctly and completely inserted, the pathway of the electromagnetic radiation is blocked between the light pipe and the phototransistor. In this manner a positive determination is correctly made. To enhance the accuracy of the disclosed device, time domain filtering is used to screen erroneous electromagnetic radiation from causing an incorrect cartridge in determination.

42 Claims, 7 Drawing Sheets

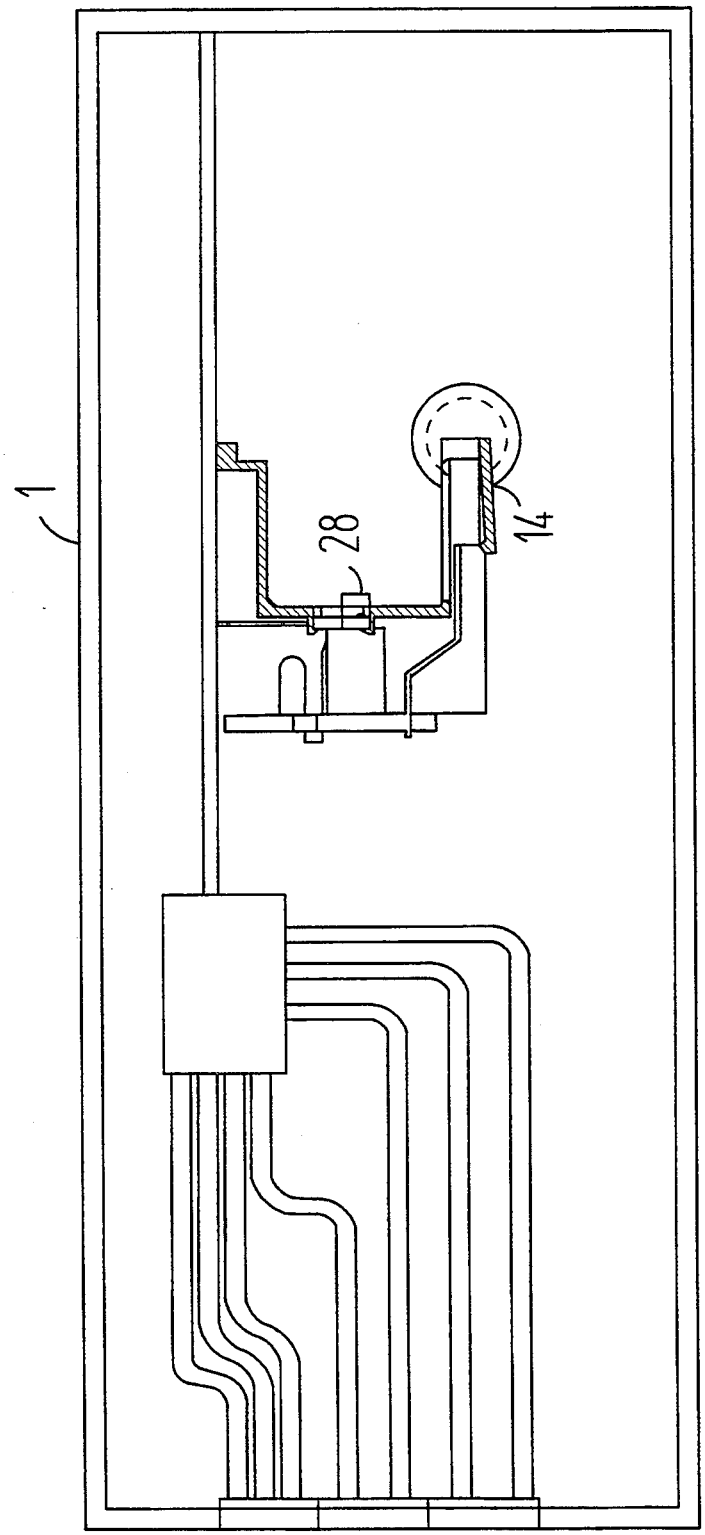

SYSETM FOR OPTICALLY SENSING THE PLACEMENT OF MAGNETIC TAPE CARTRIDGE MEDIA IN A COMPUTER MEMORY BACKUP DEVICE

BACKGROUND OF THE INVENTION

Generally, the invention relates to the field of computer memory backup devices which have standardized computer tape cartridges. More specifically, the invention focuses upon techniques for ascertaining the appropriate placement of such cartridges to allow operation of the computer memory backup device.

Since the advent of programmable information processing systems or computers, the need to store information has grown dramatically. This information storage is frequently accomplished through devices which interconnect with the computer and act relatively independently in response to signals received from the main data processing functions of the computer. These devices, known as peripheral devices, act to receive data from the main computer memory and then to store such data on a separate media within the peripheral device.

One of the aspects of typical memory devices and computer systems is their volatility—they can unintentionally loose their contents occasionally. To overcome this limitation, backup devices have evolved. Such devices serve the simple function of separately storing large amounts of data on relatively non-volatile media. In the field of these specialized devices, the use of magnetic tape media has greatly eclipsed all other types of uses. This use is so broad that magnetic tape cartridges for computer backup devices have been designed. Such cartridges specifically meet the needs of computer users in a standardized manner.

The present invention focuses upon standardized magnetic tape cartridge systems, such as are frequently used in computer tape backup systems. The American National Standards Institute defines "magnetic tape" as tape that "accepts and retains magnetic signals intended for input/output and storage purposes for information processing and associated systems." The "standardized" magnetic tape cartridge ensures that the use of the tape cartridge for computer memory backup will be optimal, as opposed to other types of media systems which might require accommodation of existing designs.

In many computer peripheral memory devices, it is desirable to utilize media which can easily be removed and reinserted, thus allowing the user to greatly expand the memory capacity associated with the computer simply by purchasing additional media in the form of disks or tapes. While each of these different types of media have unique advantages, one need runs throughout, namely the need to sense the presence of such media before operating the peripheral device. Unlike other types of mechanisms which utilize removable media such as VCRs and audio cassette players, the need to appropriately sense the presence of memory media is particularly acute when such media is used in conjunction with a computer because of the way data interface and control standards have evolved. It should be understood that within the field of removable memory media, the inventions which have been directed to video cassettes, audio cassette tapes, and other non-computer related devices deal with entirely different circumstances. For this reason, the techniques or lack thereof involved in devices unrelated to computer backup memory storage are not viewed as particularly relevant to the problems encountered in the field of computer memory storage devices which use standardized computer tape cartridges for backup purposes.

As mentioned earlier, the need to sense the presence of the memory media before operating the tape backup device is very important. In most instances a physical act is required to trigger such sensing. This physical act can occur in a variety of manners. The user can be required to take the act or the physical act can be taken by the presence of the media itself such as when the media triggers a switch or forces a mechanism to engage it internally. While the vast majority of each of these types of system have available to them interconnections or other failsafe mechanisms to avoid an inappropriate indication, the mere fact that mechanical movements or switching is often required is a significant drawback. While those skilled in the art are generally aware that such mechanical devices are susceptible to failure, the strong desire within the computing industry to adhere to standards which allow for interconnectibility and consistency of media from one manufacturer to another has acted to direct those skilled in the art away from more appropriate solutions to the problem which are unencumbered by the limitations of the existing devices.

The standards promoted within the computer tape backup industry serve as an example of the way such standardization has directed those skilled in the art away from the approach of the present invention. The standards promoted by the American National Standards Institute (ANSI) implicitly advocate the need for cartridge-in sensing through some type of mechanical device. While the limitations of such a technique have been well known by those skilled in the art, the pervasiveness of adherence to the standards has caused those to focus on making such mechanical sensing more reliable and less expensive to manufacture rather than to simply question the desirability of using a mechanical sensor in the first place. This is dramatically evident from the fact that in the same standard which implicitly provides for mechanical sensing of the cartridge-in determination, other, non-mechanical, sensing techniques are used for other purposes. Even though these techniques are readily available to those skilled in the art, the direction in the standards acts to teach those away from the solution of the present invention and to ignore potential solutions which were already utilized in the same device. In this regard, it is also true that the relative ease with which a mechanical determination could be accomplished and the minimal expense involved caused those skilled in the art of the present invention to develop preconceived notions that alternative solutions—while perhaps overcoming limitations of existing devices—would outweigh those advantages in their difficulty and expense of implementation.

Among the aspects well known to be desirable are issues relating to reliability and minimizing energy consumption. As to the first, reliability, those skilled in the art of determining the presence of a standardized magnetic tape cartridge in a computer memory backup device have long felt the need to achieve better performance. The American National Standards, however, have served to direct them away from the solutions discovered by the present invention even though the implementing arts have long been available. This was perhaps due to the fact that while those skilled in the art recognize the need for increased reliability, they failed to appreciate that one element of the problem lay in focusing upon using available optical sensing means to determine the presence or absence of a magnetic tape cartridge. Instead the specification implicitly, and other references explicitly have acted to teach away from the direction taken by the present invention. Those skilled in the art simply did not expect such advances to be possible without modification of the existing cartridges—and therefore the ANSI standards.

In sharp contrast to the preconceptions of those skilled in the art, the present invention affords not only the possibility of significant cost savings, but also dramatically increased reliability.

SUMMARY OF THE INVENTION

The present invention is directed to a device and method for determining the presence of a standardized computer tape cartridge within a computer peripheral memory backup device. The device solves the problem of achieving greater reliability in such a sensor. Importantly, through the utilization of optical sensing techniques, the present invention can be implemented in not just a cost efficient manner, but rather a manner which actually affords significant savings over those previously used. It is an object of the invention to provide a method of determining the presence of a computer tape backup cartridge in a computer peripheral device. As such, it is an object of the invention to provide a design which achieves cost savings by accommodating inherent manufacturing difficulties. Yet a further object of the invention is to provide a design which can be controlled in such a manner as to prolong the life of all components.

In achieving such sensing, an object is to provide for a technique and device which has substantially higher reliability than those dictated by existing standards. In addition, another object of the invention is to provide a design which can be readily implemented with only minor modification to existing designs. As such, the design utilizes the magnetic tape cartridge to interrupt an optical beam thus providing the indication of the media presence. In making such a determination, a further object is to avoid inaccurate determinations.

Another object of the design is to provide a device which is not sensitive to variations or interference in use and variations in the particular design of the peripheral memory backup device. As such, the present invention is relatively independent of the existing design used in the peripheral memory backup device. In addition, it is an object to provide a design which requires no re-education or even additional knowledge on behalf of the user of the device.

A further object of the present invention is to provide a design which integrates with existing standards for tape cartridge media. The invention does not require any change in the standards and in fact can utilize optical devices already present in some designs. In addition, a goal of the present invention is to make the determination with respect to the placement of the memory :media at a point in time which not only avoids inaccurate readings, but is consistent with prior devices and thus integrates well within existing designs. Naturally, further objects of the invention are disclosed throughout other areas of the specification and claims.

BRIEF DESCRIPTION OF THE DRAWINGS

FIG. 2 is a cross sectional view of the prior art showing a mechanical switch with no media present.

DETAILED DESCRIPTION OF THE PREFERRED EMBODIMENTS

Figure 1A:
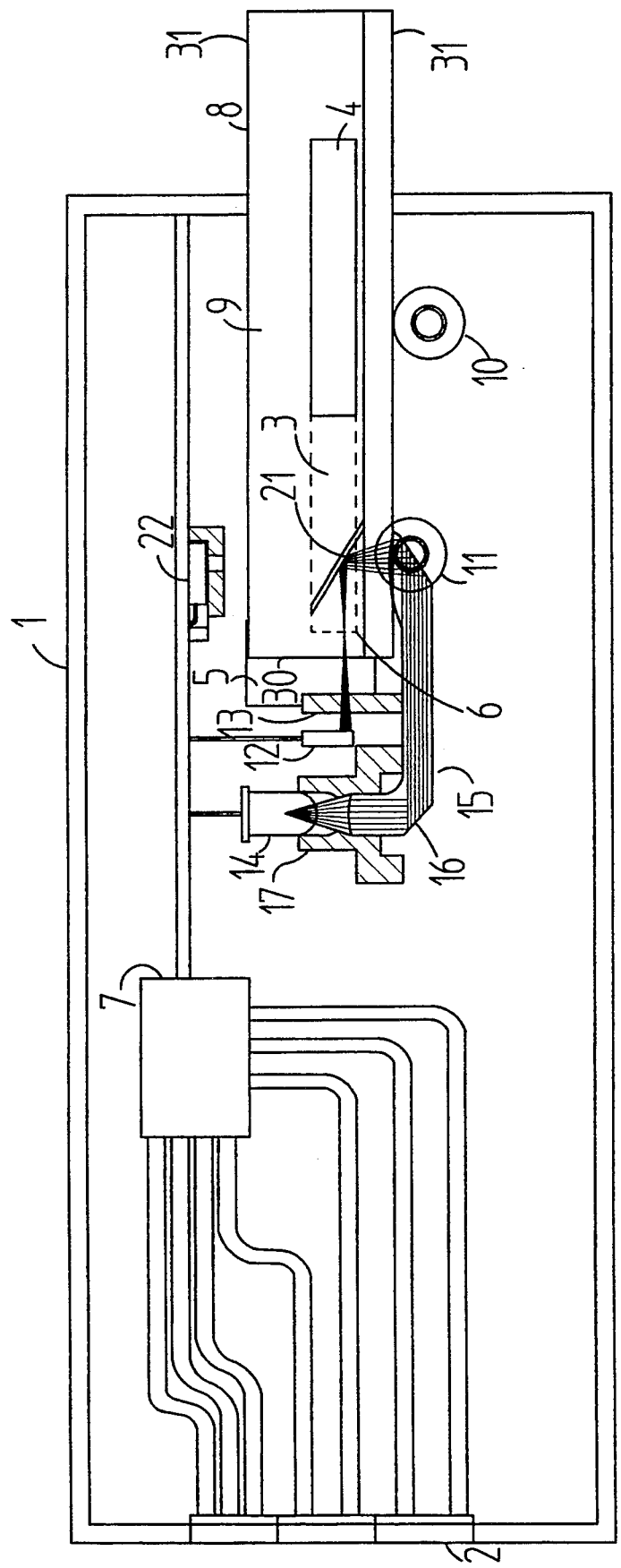
FIG. 1a is a cross sectional view of an embodiment of the present invention having a single optical source and having tape cartridge media present.
Figure 1B:
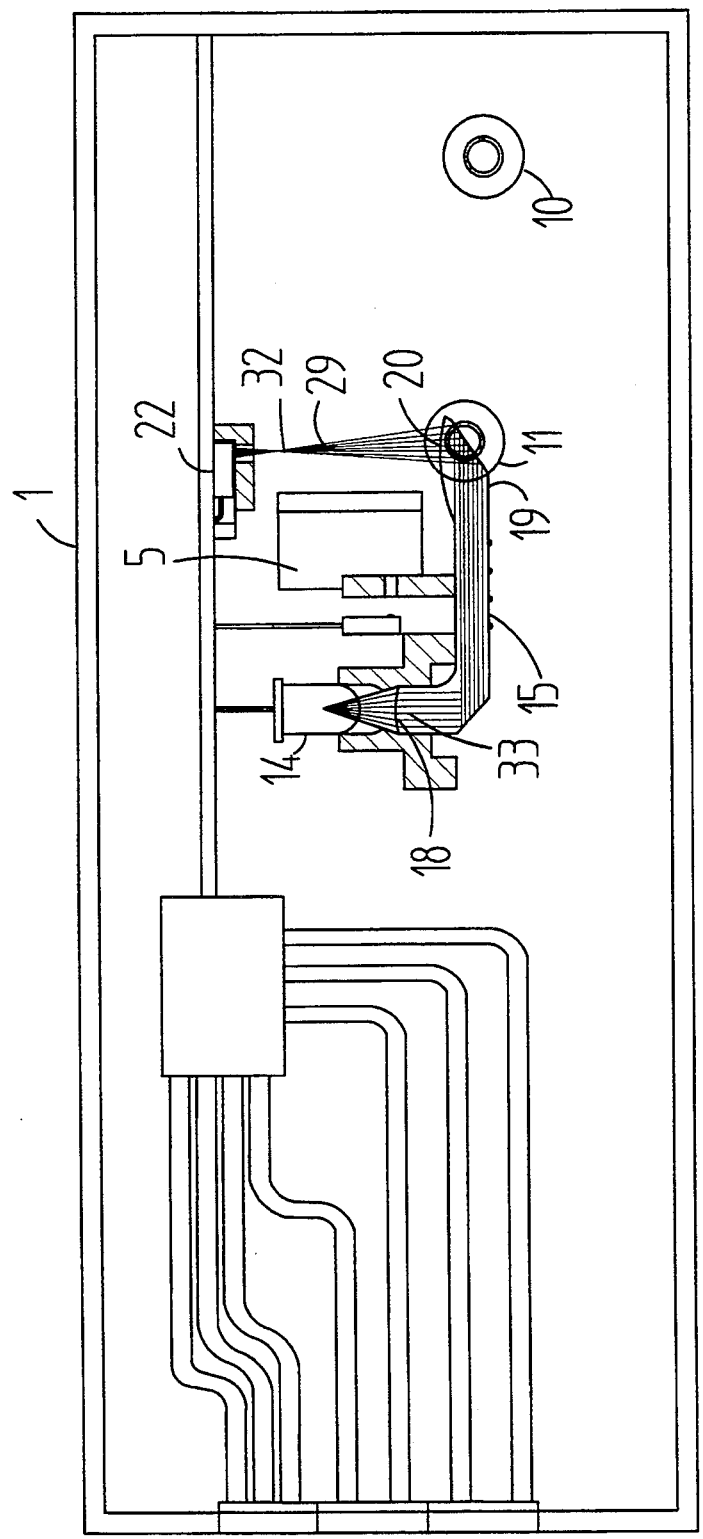
FIG. 1b is a cross sectional view of an embodiment of the present invention having a single optical source with no tape cartridge media present.

As can be seen from the drawings, the basic concepts of the present invention may be embodied in a variety of different ways. FIGS. 1a and 1b show an embodiment designed to integrate into devices utilizing quarter-inch cartridge media in the simplest fashion. Computer memory backup device (1) is connected to computer, not shown, through computer interconnection (2). Computer interconnection (2) allows for interchange of information between computer memory backup device (1) and the computer. This information or data is stored in any of the various forms known to those skilled in the art on computer tape memory media Computer tape memory media (3) is wound on spool (4) in a manner so as to pass in front of magnetic head (5) at access region Magnetic head (5) acts to sense the data and transfer it to controller (7). Controller (7) then transfers data with or without some internal conversion to computer through computer interconnection (2).

Controller (7) can be any possibility of circuitry or devices as are known to those skilled in the art. Essentially controller (7) need only act to effect proper operation of computer tape memory media (3) and to transfer data or information between the computer—or its other peripheral devices—and computer tape memory media (3). The way in which controller (7) achieves such objects can vary from simple interconnection to a fully programmable device in its own right. Certainly in the latter designs, data manipulation and variable programming is possible. Controller (7) may thus include its own programmable data processor and data storage capabilities. In the event a microprocessor with programmable features is used, some of the features of the present invention can even be embodied in software or programming which then directs either the computer, or controller (7), to accomplish. the desired ends.

Importantly, computer tape memory media (3) is contained within computer tape cartridge (8). Computer tape cartridge 8) is designed to be easily removed from computer memory backup device (1) as required by the user. To allow for broadly expandable memory capability, the computer memory backup device (1) is designed to allow removal and reinsertion of a variety of computer tape cartridges (8). As mentioned earlier, in the particular industry standards have evolved such that computer tape cartridge (8) may be manufactured by a variety of entities and yet be usable in a variety of computer memory backup devices regardless of manufacturer. As a result of these standards, computer tape cartridge (8) includes standardized container (9). For uniformity, standardized container (9) conforms to the specifications established by the American National Standards Institute (ANSI) mentioned earlier. While other types of media are certainly possible, such have not been optimized for use in a computer memory backup device. Through the development of the ANSI standards, computer tape cartridge (8) has been refined to be optimal in terms of memory storage capabilities and use for memory backup purposes.

To allow expanded memory capabilities and other features, computer memory backup device (1) is designed to include some means for releasably accepting standardized container (9). Certainly, the means for releasably accepting standardized container (9) can vary so long as it is consistent with the features contained in standardized container (9). For simplicity purposes, the means for releasably accepting standardized container (9) is shown in FIG. 1b simply as a series of retaining wheels (10) and moveable wheel (11). Moveable wheel (11) is configured so as to allow displacement in order to engage standardized container (9).

In addition to receiving signals from magnetic head (5), controller (7) is designed to receive signals from optical tape position sensor (12). Optical tape position sensor (12) is placed in shielded mounting (13). In this position, optical tape position sensor (12) is designed to receive optical signals emitted by a means for emitting electromagnetic radiation. As shown in FIGS. 1a and 1b, the means for emitting electromagnetic radiation is light emitting diode (14). Light emitting diode emits electromagnetic radiation typically in the near infrared spectrum. Unique to the present invention is the fact that light emitting diode (14) emits the electromagnetic radiation at some distance from computer tape cartridge (8). The electromagnetic radiation emitted by light emitting diode (14) is transferred to the cartridge through a suitable means for directing the electromagnetic radiation. As shown in FIG. 1a, the means for directing the electromagnetic radiation is light pipe (15). Certainly, other types of means for directing the electromagnetic radiation could be used and should be considered to fall within the scope and spirit of the present invention. One such alternative type of system might involve the use of optical fibers or the like.

Controller (7) also includes a means for responding to a determination of appropriate placement of standardized container (9). As one element of the means for determining appropriate placement, controller (7) acts to sense interruption of electromagnetic radiation upon phototransistor (22). When such interruption is sensed, appropriate placement of the cartridge is assumed.

Light pipe (15) has the property of total refraction of the electromagnetic radiation emitted by light emitting diode (14) to thus pass the electromagnetic radiation from light emitting diode (14) towards appropriate areas of computer tape cartridge (8). Light pipe (15) also includes reflective surfaces (16). In addition, light pipe (15) may be mounted with emission shields (17). Emission shields (17) function similarly to and serve the same purpose as shielded mounting (13). They block stray radiation. Light pipe (15) has both an input end (33) and an exit end (19).

Integral collecting lens (18) positioned at the input end (33) of light pipe (15) serves to transfer as much electromagnetic radiation from light emitting diode (14) to light pipe (15) as possible. In addition to simply passing electromagnetic radiation from one place to another, the means for directing the electromagnetic radiation can also include a means for focusing such electromagnetic radiation. This means for focusing can be an integral focusing lens (20), as shown on exit end (19) of light pipe (15).

In accordance with the design standards set forth in the ANSI specifications, computer tape cartridge (8) includes some means for aiming the electromagnetic radiation through computer tape media (3) at access region (6). This means for aiming is typically integral mirror assembly (21). Integral mirror assembly (21) is mounted in a fixed manner within standardized container (9). In this fashion, it directs the electromagnetic radiation through holes in the computer tape memory media (3) at access region (6) such that the electromagnetic radiation is then received and sensed by optical tape position sensor (12). Standardized container also includes first and second cartridge faces (31).

In normal operation, with computer tape cartridge (8) appropriately placed within computer memory backup device (1), electromagnetic radiation emitted from light emitting diode 14) is collected by integral collecting lens (18) and then passed through light pipe (15). In exiting light pipe (15), the electromagnetic radiation is focused through integral focusing lens (20). It then passes through a port in standardized container 9) and onto integral mirror assembly (21). Integral mirror assembly (21) then directs the electromagnetic radiation at right angles to pass through computer tape memory media (3) and be received by optical tape position sensor (12). In prior art devices, such electromagnetic radiation served no purpose when computer tape cartridge (8) was not present. In the present invention, a means for receiving the electromagnetic radiation exists. This means for receiving electromagnetic radiation is shown as phototransistor (22). Phototransistor (22) is connected to controller (7) and thus acts to sense the presence of computer tape cartridge (8). Since the simplest embodiment makes use of electromagnetic radiation emitted for other purposes, it can be seen that phototransistor (22) is placed some distance from access end (30) of computer tape cartridge (8). In order to accommodate this displacement, controller (7) may include time delay circuitry. This circuitry serves to delay the activation by controller (7) of computer memory backup device (1) until the tape is fully inserted. Since most cartridge sensing devices will include some region in which an indication might be given without the tape being fully in, he delay caused by time delay circuitry assures a more accurate response. In addition, the sensor can be placed in such a manner that engagement of standardized container (9) with moveable wheel (11) is assured upon appropriate sensing. While other techniques are certainly possible, one desire of the initial embodiment shown in FIG. 1a is to afford the minimum amount of modification as well as not to require any changes in standardized cartridge (9).

An aspect of the present invention is that it is designed to increase the accuracy of the determining means. Since stray signals are always possible, some type of filtering is usually desirable. One possibility could be to receive electromagnetic radiation only a fraction of the time thereby reducing the possibility of an erroneous determination to the time the receiving means is enabled. Another possibility, shown in the embodiment of FIG. 1b, is that light emitting diode (14)

may be pulsed. This pulsing not only serves to prolong the life of light emitting diode, but also allows for time domain filtering.

Figure 6:
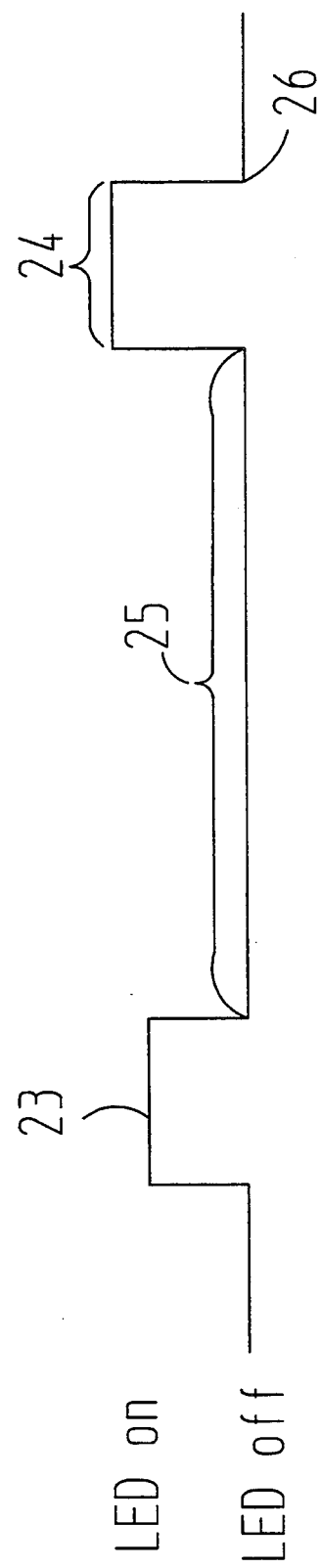
FIG. 6 is a plot of the output of the light emitting diode.

Time domain filtering is a process whereby a repetitive number of pulses may be received by phototransistor (22) before the determination of appropriate placement of standardized container (9) is made. This technique can be readily understood by those skilled in the art even though it has not been used in this manner. Referring to FIG. 6 it can be seen that using a simple pulse function on light emitting diode allows for simple time domain filtering. For efficiency sake, the absence of phototransistor (22) receiving two consecutive pulses could be utilized determine the appropriate placement of the media. Naturally, the testing for the presence or absence of sensing two or more consecutive pulses is certainly possible for greater accuracy.. The means for activating computer memory backup device (1) within controller (7) then is triggered upon the interruption of sensing two or more consecutive pulses. Upon such triggering, computer memory backup device is activated in the sense that it is ready to be controlled and will respond to input from the computer.

As shown in FIG. 6, it can be seen that in making such a sensing determination, pulses (23) are characterized by emission periods (24) and dormant periods (25). Emission periods (24) also have end of emission period point (26). For even more accuracy, phototransistor (22) can be read only at times corresponding to the end of emission period point (26), that is the sensor is not checked continuously by controller (7). This affords two advantages. First, stray signals occurring during the dormant period would not be sensed even though they would be sufficient to trigger phototransistor (22). To accomplish this some means for sampling phototransistor (22) can be included. This simply serves to read the signal of phototransistor (22) at occasional intervals. By reading the device occasionally at times which could be regular, noise at times when phototransistor (22) is not read or sampled is irrelevant. In addition, synchronizing the sampling with the emissions of light emitting diode (14) affords greater filtering. Second, by appropriately choosing emission periods (24) to have durations which correspond to the response time of phototransistor (22), phototransistor (22) can be read at only times at which a true signal should be received. This aspect further adds to "the element of time domain filtering by providing greater accuracy in avoiding inappropriate determinations. Of course, it could be triggered even without any pulsing of light emitting diode 14).

Referring to FIG. 2, a cross sectional view of the prior art utilizing a mechanical switch with no cartridge present, it can be seen that the prior art devices are very similar to the present invention in several regards. Two important differences are shown to exist, however.

Figure 3:
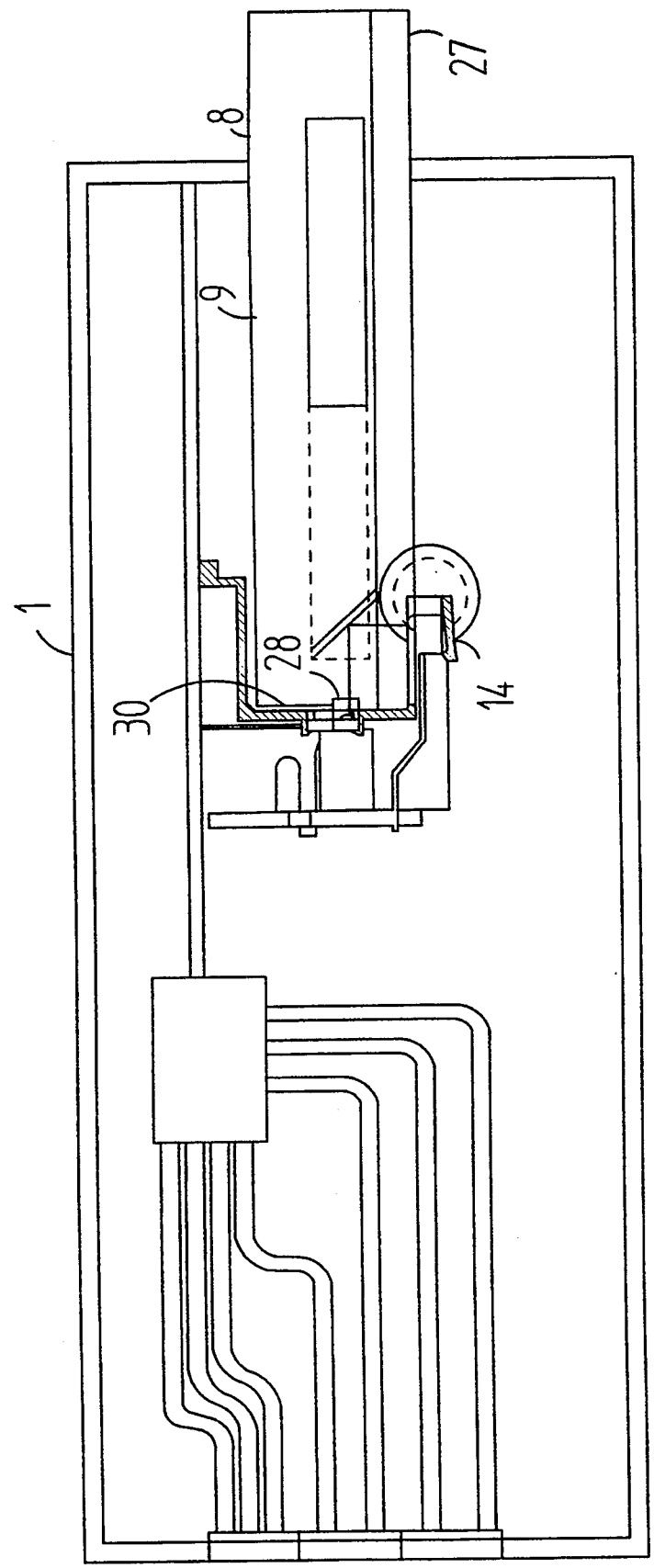
FIG. 3 is a cross sectional view of the prior art having a mechanical switch with tape cartridge media present.

The first aspect is that light emitting diode (14) is placed adjacent to standardized container (9). As mentioned, one of the goals of the present invention is to avoid the effects of electrical noise in the means for determining the appropriate placement of the tape cartridge. Prior to the present invention, this aspect was either ignored or viewed as a "necessary evil" those skilled in the art. This was because it was felt that for maximum reliability the means for emitting electromagnetic radiation and the means for receiving electromagnetic radiation had to be in close proximity. In this regard the teachings of the ANSI specification furthered this preconception. Since standardized container (9) is designed to include base plate as shown in FIG. 3, and since base plate (27) is usually made aluminum or some other metallic material for durability reasons.. and electrical charge and heat dissipation, light emitting diode (14), and anything else in its vicinity, can be subject to some electrical interference. This is overcome in the present invention by including a means for insulating the means for determining from the effects of electrical noise. A number of techniques could be utilized such as encasing and grounding the means for determining. For simplicity a means for separating is utilized in this embodiment. The means for separating the means for determining in this case the light emitting diode (14)) from standardized container (9) and the base plate (27) avoids any accumulation of charge. In this embodiment, the means for separating is light pipe (15), as mentioned earlier. While such a simple aspect as separating the means for determining from standardized container (9) might appear to be unremarkable, the simple fact that ANSI standards show light emitting diode (14) or some other type of light source to be placed in just such a position led those skilled in the art to utilize this configuration without question. Again, light pipe (15) is only one way of accomplishing this goal; optical fibers or the like are alternatives which may also be used. In addition to separating light emitting diode (14) from base plate (27), phototransistor (22) could also be so separated. Since both the use of a light emitting diode and a phototransistor are preferred, and since each of these devices are especially subject to electrical interference, this aspect of the invention can by itself represent a significant improvement from manufacturing and performance perspectives.

A second aspect in which the present invention differs from the prior art is in the technique of determining the placement of the cartridge. In FIG. 2, it can be seen that mechanical sensing switch (28) is placed adjacent to access end (30) of standardized container (9). Standardized container (9) then physically displaces and switches mechanical sensing switch (28) to provide the determination of appropriate placement of computer tape cartridge (8).

Referring now to FIG. 3, it can be seen that when computer tape cartridge (8) is placed in computer memory backup device 1), access end (30) of standardized container (9) physically engages mechanical sensing switch (28). This type of sensing technique has several limitations, most notably that the use of mechanical means for sensing is less reliable and more prone to problems than the optical sensing technique discussed earlier. As mentioned earlier, while such limitations are well known to those skilled in the aft, the prior teachings of the ANSI specifications simply led those to accept these techniques without question.

Figure 4:
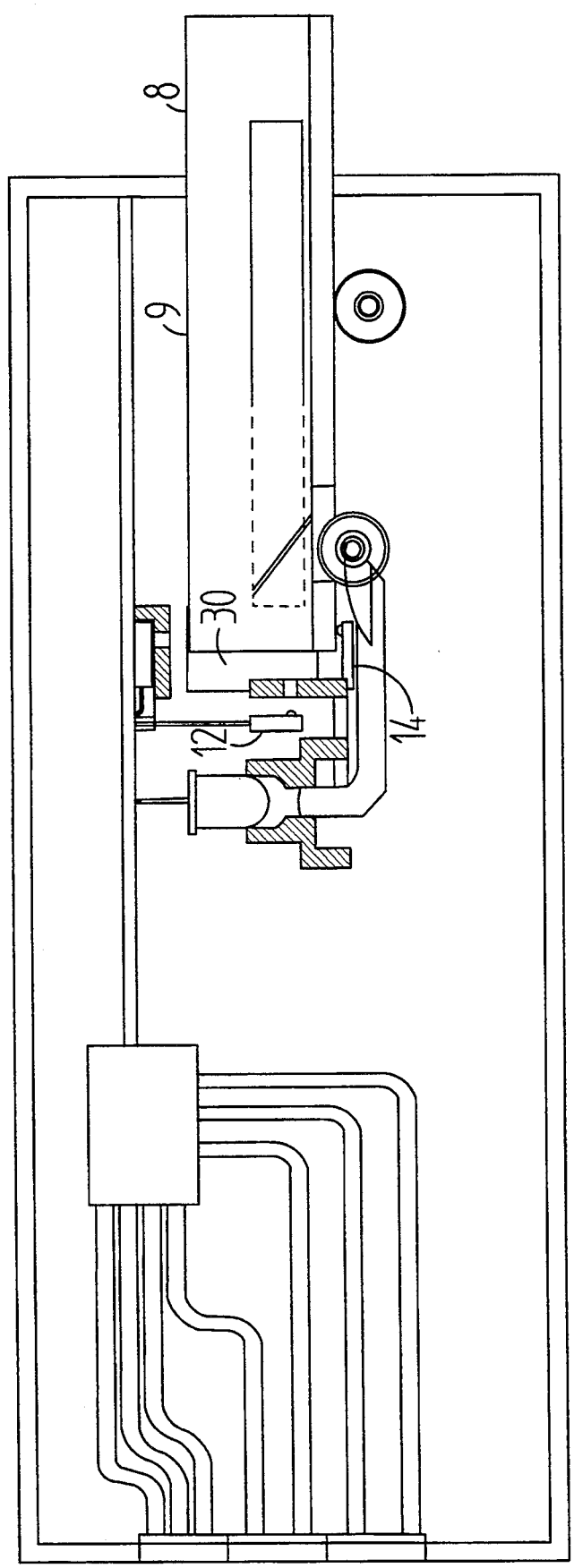
FIG. 4 is a cross sectional view of another embodiment representing the modification of existing designs with tape cartridge media present.
Figure 5:
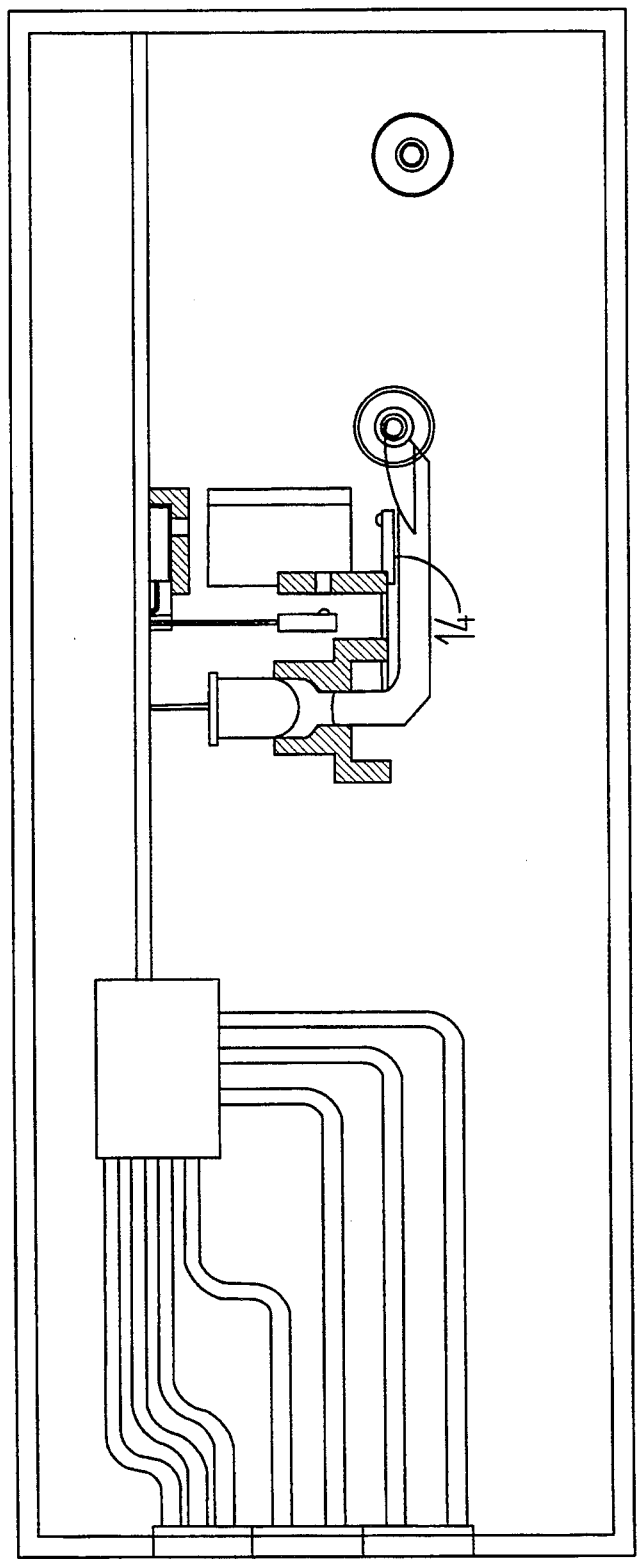
FIG. 5 is a cross sectional view of the same embodiment shown in FIG. 4 with no media present.

One of the features of the present invention in its most simplest embodiment is the element of a time delay discussed earlier. This time delay serves to delay the activation of computer memory backup device (1) until computer tape cartridge (8) is fully inserted. Such a delay is usually unnecessary with the use of mechanical sensing switch (28) since it is usually positioned adjacent to access end (30). Referring to FIGS. 4 and 5, a simple embodiment using a source and sensor closer to access end (30), it can be seen that this delay can be overcome to a significant degree by simply placing the means for determining appropriate placement of the standardized container (9) towards the access end (30)

of computer tape cartridge (8). In such an embodiment, time delay circuitry might become unnecessary.

One of the disadvantages of the embodiment shown in FIGS. 4 and 5 is that either an additional light emitting diode (14 is necessary or that some type of light divider would be used. By a light divider it is meant that although one means for emitting electromagnetic radiation would be utilized as shown in FIGS. 1a and 1b, light pipe (15) might have a restricted diameter at some point to allow separate reflection of a portion of the electromagnetic radiation toward phototransistor (22). Such a division of the electromagnetic radiation would serve the useful advantage of allowing only one source to provide electromagnetic radiation at two different locations with respect to standardized container (9). An unfortunate disadvantage is that of dividing the effective power received by the various sensors. While this is not so much a problem for phototransistor (22) utilized in determining the appropriate position of computer memory tape cartridge (8) it is more of an impact upon that received by optical tape position sensor (12) for reasons unrelated to the present invention.

Referring again to FIGS. 4 and 5, the disadvantage of utilizing two light emitting diodes is readily apparent. Since the means for emitting electromagnetic radiation generally consumes significant amounts of power and is expensive to include, the preconception by those skilled in the art that any additional utilization of an optical sensing means was undesirable was firmly established. This was also supported by the ANSI specifications as mentioned earlier.

As mentioned with reference to FIG. 1a, light pipe (15) includes integral focusing lens (20). Integral focusing lens (20) serves to direct electromagnetic radiation at appropriate places. While the natural tendency would be to position phototransistor (22) at a point where the electromagnetic radiation is focused for maximum sensitivity, the present invention actually achieves the opposite. As can be seen in FIG. 1b, electromagnetic radiation traverses path (29) from integral focusing lens (20) to phototransistor (22). Through action of integral focusing lens (20), the electromagnetic radiation meets at focal point (32). While the amount of power per area received is at its maximum at focal point (32), the relative small size of phototransistor (22) would make positioning of phototransistor (22) very sensitive. For instance, if phototransistor (22) were placed slightly to the side of path (29), the sensing system would be inoperative. To allow for manufacturing expediency and lesser costs, integral focusing lens (20) focuses the electromagnetic radiation at a point which does not coincide with phototransistor (22). This allows phototransistor (22) to be placed without any unusual alignment or other tolerances necessary.

The foregoing discussion and the claims which follow describe the preferred embodiments of the present invention. Particularly, with respect to the claims, it should be understood that changes may be made without departing from its essence. In this regard, it is intended that such changes would still fall within the scope of the present invention. It simply is not practical to describe and claim all possible revisions to the present invention which may be accomplished. To the extent such revisions utilize the essence of the present invention each would naturally fall within the breath of protection encompassed by this patent. This is particularly true for the present invention since its basic concepts and understandings are fundamental in nature and can be broadly applied.

We claim:

1. A controller for ascertaining appropriate placement of a standardized computer tape cartridge in a computer memory backup device comprising:
   a. computer tape memory media;
   b. a standardized container for said computer tape memory media wherein said computer tape memory media and said standardized container comprise a tape media system having an integral mirror assembly positioned for sensing through said computer tape memory media;
   c. a means for releasably accepting said standardized container;
   d. a sensor means which determines appropriate placement of said standardized container within said means for releasably accepting comprising:
      (1) a means for emitting electromagnetic radiation wherein said means for emitting comprises a light emitting diode directed toward said mirror assembly when said standardized cartridge is appropriately placed; and
      (2) a sensor which receives said electromagnetic radiation; and
   e. a trigger which activates said computer memory backup device wherein said trigger is responsive to said sensor means which determines appropriate placement of said standardized container within said means for releasably accepting said standardized container.

2. A controller for ascertaining appropriate placement of a standardized computer tape cartridge in a computer memory backup device as described in claim 1 wherein said electromagnetic radiation travels a path from said means for emitting to said sensor which receives said electromagnetic radiation and wherein said standardized container interrupts said path when appropriately place.

3. A controller for ascertaining appropriate placement of a standardized computer tape cartridge in a computer memory backup device as described in claim 1 wherein said system comprises no more than one means for emitting electromagnetic radiation.

4. A controller for ascertaining appropriate placement of a standardized computer tape cartridge in a computer memory backup device as described in claim 3 wherein said electromagnetic radiation travels a path from said means for emitting to said means for receiving and wherein said standardized container interrupts said path when appropriately placed.

5. A controller for ascertaining appropriate placement of a standardized computer tape cartridge in a computer memory backup device as described in claim 4 wherein said standardized container comprises a means for aiming the electromagnetic radiation inside of the standardized container and wherein said path of said electromagnetic radiation passes through said means for aiming when said standardized container is appropriately placed.

6. A controller for ascertaining appropriate placement of a standardized computer tape cartridge in a computer memory backup device as described in claims 3 or 5 wherein said sensor means which determines appropriate placement of said standardized container further comprises time delay circuitry which delays said determination.

7. A controller for ascertaining appropriate placement of a standardized computer tape cartridge in a computer memory backup device as described in claims 2 or 5 wherein said means for receiving comprises a phototransistor and wherein said phototransistor is separated from said standardized container.

8. A controller for ascertaining appropriate placement of a standardized computer tape cartridge in a computer memory backup device as described in claim 7 wherein said means for emitting comprises a light emitting diode and wherein said light emitting diode is separated from said standardized container.

9. A controller for ascertaining appropriate placement of a standardized computer tape cartridge in a computer memory backup device as described in claim 1 wherein said means for emitting comprises a light emitting diode and wherein said means for receiving comprises a phototransistor.

10. A controller for ascertaining appropriate placement of a standardized computer tape cartridge in a computer memory backup device as described in claims 1, 3, 5, or 9 wherein said sensor means which determines appropriate placement of said standardized container with in said means for releasably accepting further comprises a means for operating said means for emitting the electromagnetic radiation and wherein said means for operating causes said means for emitting to be on intermittently.

11. A controller for ascertaining appropriate placement of a standardized computer tape cartridge in a computer memory backup device as described in claim 7 wherein said electromagnetic radiation is focused and wherein said electromagnetic radiation is out of focus at said phototransistor.

12. A controller for ascertaining appropriate placement of a standardized computer tape cartridge in a computer memory backup device as described in claims 1, 3, or 9 wherein said electromagnetic radiation is focused and wherein said electromagnetic radiation is out of focus at said phototransistor.

13. A controller for ascertaining appropriate placement of a standardized computer tape cartridge in a computer memory backup device as described in claim 5 wherein said computer tape memory media and said standardized container comprise a quarter-inch magnetic tape media system having an integral mirror assembly positioned for sensing through said computer tape memory media, wherein said means for emitting comprises a light emitting diode directed toward said mirror assembly when said standardized cartridge is appropriately placed, and wherein said means for receiving comprises a phototransistor positioned to receive said electromagnetic radiation when said standardized cartridge is removed from said means for releasably accepting said standardized cartridge.

14. A controller for ascertaining appropriate placement of a standardized computer tape cartridge in a computer memory backup device as described in claim 13 wherein said sensor means which determines appropriate placement further comprises a means for directing said electromagnetic radiation from said light emitting diode to said integral mirror assembly.

15. A controller for ascertaining appropriate placement of a standardized computer tape cartridge in a computer memory backup device as described in claim 14 wherein said means for directing comprises a light pipe.

16. A controller for ascertaining appropriate placement of a standardized computer tape cartridge in a computer memory backup device as described in claim 15 wherein said standardized cartridge has an access end and a first and a second cartridge face and wherein said light emitting diode is positioned adjacent to said access end, said light pipe is positioned adjacent to said first cartridge face, and said phototransistor is positioned adjacent to said second cartridge face.

17. A controller for ascertaining appropriate placement of a standardized computer tape cartridge in a computer memory backup device as described in claim 16 wherein said light pipe has an exit end and wherein said light pipe comprises an integral lens on said exit end for focusing said electromagnetic radiation and wherein said electromagnetic radiation is out of focus at said phototransistor.

18. A controller for ascertaining appropriate placement of a standardized computer tape cartridge in a computer memory backup device as described in claim 17 wherein said sensor means which determines appropriate placement of said standardized container within said means for releasably accepting further comprises a means for operating said means for emitting the electromagnetic radiation and wherein said means for operating causes said means for emitting to be on intermittently.

19. A controller for ascertaining appropriate placement of a standardized computer tape cartridge in a computer memory backup device as described in claim 18 wherein said means for operating causes repetitive pulses having an emission period and wherein said phototransistor is read synchronously at times corresponding to the end of said emission period.

20. A controller for ascertaining appropriate placement of a standardized computer tape cartridge in a computer memory backup device comprising:
   a. computer tape memory media;
   b. a standardized container for said computer tape memory media wherein said container has a base;
   c. a means for releasably accepting said standardized container;
   d. a sensor means which determines appropriate placement of said standardized container within said means for releasably accepting comprising:
      (1) a means for emitting electromagnetic radiation;
      (2) a sensor which receives said electromagnetic radiation, thereby creating a signal; and
      (3) a filter means which increases the accuracy of said sensor means which determines appropriate placement of said standardized container by reducing the possibility of an erroneous determination, wherein said filter means is independent of said container; and
   e. a trigger which activates said computer memory backup device wherein said trigger is responsive to said sensor means which determines appropriate placement of said standardized container within said means for releasably accepting said standardized container.

21. A controller for ascertaining appropriate placement of a standardized computer tape cartridge in a memory backup device as described in claim 20 wherein said filter means which increases the accuracy of said sensor means which determines appropriate placement of said standardized container comprises a means for pulsing said electromagnetic radiation from said means for emitting.

22. A controller for ascertaining appropriate placement of a standardized computer tape cartridge in a memory backup device as described in claim 21 wherein said sensor which receives said electromagnetic radiation has a reaction time and wherein said means for pulsing creates repetitive emission and dormant periods of time for said means for emitting and wherein said emission period of time corresponds to said reaction time of said sensor which receives said electromagnetic radiation.

23. A controller for ascertaining appropriate placement of a standardized computer tape cartridge in a memory backup device as described in claim 22 wherein said sensor means which determines appropriate placement of said standardized container comprises a means for sampling said signals created by said sensor which receives said electromagnetic radiation and wherein said means for sampling intermittently reads said signals created by said sensor which receives said electromagnetic radiation.

24. A controller for ascertaining appropriate placement of a standardized computer tape cartridge in a memory backup device as described in claim 23 wherein said emission periods have an end and wherein said means for sampling reads said signals created by said sensor which receives said electromagnetic radiation at times corresponding to said end of said emission periods.

25. A controller for ascertaining appropriate placement of a standardized computer tape cartridge in a memory backup device as described in claim 20 or 21 wherein said sensor means which determines appropriate placement of said standardized container comprises a means for sampling said signals created by said sensor which receives said electromagnetic radiation and wherein said means for sampling intermittently reads said signals created by said sensor which receives said electromagnetic radiation.

26. A controller for ascertaining appropriate placement of a standardized computer tape cartridge in a memory backup device as described in claim 20 wherein electrical noise exists within said backup device, and further comprising a means for insulating said sensor means which determines appropriate placement of said standardized container from the effects of said electric noise.

27. A controller for ascertaining appropriate placement of a standardized computer tape cartridge in a memory backup device as described in claim 26 wherein said means for insulating comprises a means for sampling said signals created by said sensor which receives said electromagnetic radiation and wherein said means for sampling intermittently reads said signals created by said sensor which receives said electromagnetic radiation.

28. A controller for ascertaining appropriate placement of a standardized computer tape cartridge in a memory backup device as described in claim 27 wherein said means for insulating further comprises a means for pulsing said electromagnetic radiation from said means for emitting.

29. A controller for ascertaining appropriate placement of a standardized computer tape cartridge in a memory backup device as described in claim 28 wherein said means for insulating further comprises a means for separating said sensor means which determines appropriate placement of said standardized container from said container.

30. A controller for ascertaining appropriate placement of a standardized computer tape cartridge in a memory backup device as described in claim 29 wherein said means for insulating further comprises a means for separating said means for receiving said electromagnetic radiation from said base and wherein said means for receiving is a phototransistor.

31. A controller for ascertaining appropriate placement of a standardized computer tape cartridge in a memory backup device as described in claim 30 wherein said means for insulating further comprises a means for separating said means for emitting electromagnetic radiation from said base and wherein said means for emitting is a light emitting diode.

32. A controller for ascertaining appropriate placement of a standardized computer tape cartridge in a memory backup device as described in claim 29 wherein said means for insulating further comprises a means for separating said means for emitting electromagnetic radiation from said base and wherein said means for emitting is a light emitting diode.

33. A controller for ascertaining appropriate placement of a standardized computer tape cartridge in a memory backup device as described in claim 28 wherein said means for insulating further comprises a time domain filter means.

34. A controller for ascertaining appropriate placement of a standardized computer tape cartridge in a memory backup device as described in claim 33 wherein said means for pulsing results in pulses and wherein said time domain filter means comprises said means for sampling and wherein said means for sampling samples for only two consecutive pulses.

35. A controller for ascertaining appropriate placement of a standardized computer tape cartridge in a computer memory backup device as described in claim 34 wherein said electromagnetic radiation travels a path from said means for emitting to said sensor which receives said electromagnetic radiation and wherein said standardized container interrupts said path when appropriately placed.

36. A controller for ascertaining appropriate placement of a standardized computer tape cartridge in a computer memory backup device as described in claim 34 wherein said system comprises no more than one means for emitting electromagnetic radiation.

37. A controller for ascertaining appropriate placement of a standardized computer tape cartridge in a computer memory backup device as described in claim 36 wherein said electromagnetic radiation travels a path from said means for emitting to said sensor which receives said electromagnetic radiation and wherein said standardized container interrupts said path when appropriately placed.

38. A controller for ascertaining appropriate placement of a standardized computer tape cartridge in a computer memory backup device as described in claim 37 wherein said standardized container comprises a means for aiming the electromagnetic radiation inside of the standardized container and wherein said path of said electromagnetic radiation passes through said means for aiming when said standardized container is appropriately placed.

39. A controller for ascertaining appropriate placement of a standardized computer tape cartridge in a computer memory backup device as described in claims 38 wherein said sensor means which determines appropriate placement of said standardized container further comprises time delay circuitry which delays said determination.

40. A controller for ascertaining appropriate placement of a standardized computer tape cartridge in a computer memory backup device as described in claims 39 wherein said means for receiving comprises a phototransistor and wherein said phototransistor is separated from said standardized container.

41. A controller for ascertaining appropriate placement of a standardized computer tape cartridge in a computer memory backup device as described in claim 40 wherein said means for emitting comprises a light emitting diode and wherein said light emitting diode is separated from said standardized container.

42. A controller for ascertaining appropriate placement of a standardized computer tape cartridge in a computer memory backup device as described in claim 41 wherein said electromagnetic radiation is out of focus at said phototransistor.

* * * * *